United States Patent
Määttä

(10) Patent No.: US 6,807,712 B2
(45) Date of Patent: Oct. 26, 2004

(54) HINGE HAVING ENGAGEMENT SURFACE TO RESTRAIN ROTATIONAL MOVEMENT AND ELECTRONIC DEVICE CONTAINING SUCH A HINGE

(75) Inventor: Esa-Sakari Määttä, Tampere (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/892,389

(22) Filed: Jun. 27, 2001

(65) Prior Publication Data

US 2002/0001172 A1 Jan. 3, 2002

(30) Foreign Application Priority Data

Jun. 29, 2000 (FI) .............................................. 20001551

(51) Int. Cl.[7] .............................................. E05D 11/10
(52) U.S. Cl. .............................. 16/331; 16/344; 16/348; 16/374; 379/433.13
(58) Field of Search .................... 16/327, 331, 343, 16/344, 348, 349, 374; 361/681; 379/433.13

(56) References Cited

U.S. PATENT DOCUMENTS

| | | | | |
|---|---|---|---|---|
| 5,111,503 A | * | 5/1992 | Takagi | .......................... 16/260 |
| 5,566,048 A | * | 10/1996 | Esterberg et al. | ............. 16/307 |
| 5,636,275 A | | 6/1997 | Takagi et al. | ................ 379/433 |
| 5,651,063 A | * | 7/1997 | Ji et al. | .......................... 16/335 |
| 5,652,694 A | | 7/1997 | Martin | ........................ 361/681 |
| 5,715,576 A | * | 2/1998 | Liu | .............................. 16/303 |
| 5,905,796 A | * | 5/1999 | Jung | ............................ 16/303 |
| 5,987,122 A | * | 11/1999 | Daffara et al. | ......... 379/433.13 |
| 6,115,886 A | * | 9/2000 | Fujita | ........................... 16/284 |
| 6,421,878 B1 | * | 7/2002 | Kaneko et al. | ................ 16/330 |

FOREIGN PATENT DOCUMENTS

| | | |
|---|---|---|
| EP | 0402924 | 12/1990 |
| EP | 0404166 | 12/1990 |
| EP | 0765063 | 3/1997 |
| EP | 0801489 | 10/1997 |
| EP | 0886222 | 12/1998 |
| EP | 0927923 | 7/1999 |
| JP | 2001-287582 | * 10/2001 |

* cited by examiner

*Primary Examiner*—Gary S. Hartmann
(74) *Attorney, Agent, or Firm*—Perman & Green, LLP

(57) ABSTRACT

A portable electronic device (10) such as a mobile phone comprises two body parts (12, 14) moveably connected by hinges (16). Each hinge comprises a shaft part (22) and a housing part (20), the parts being relatively moveable about a common axis of rotation. The shaft part has a shaft pin (28) lying on the common axis of rotation and a leg (24) extending laterally with respect to the shaft pin. The housing part has an groove (36, 38) and a bore (32), the bore co-operating with the shaft pin and the groove engaging with the leg to restrain the shaft part from rotational movement. The shaft part is moveable relative to the housing part between a first position in which the leg is engaged with the groove and a second position in which the leg is not engaged with the groove.

10 Claims, 7 Drawing Sheets

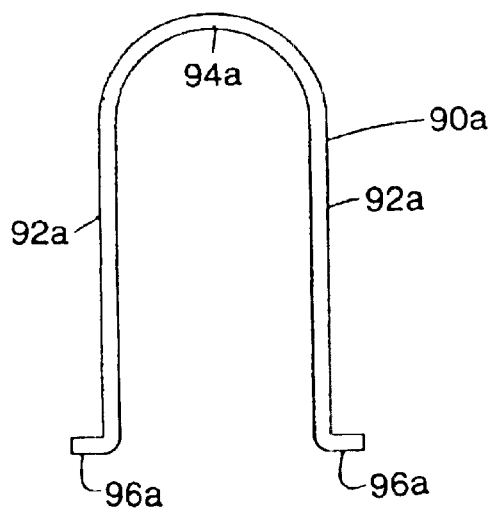
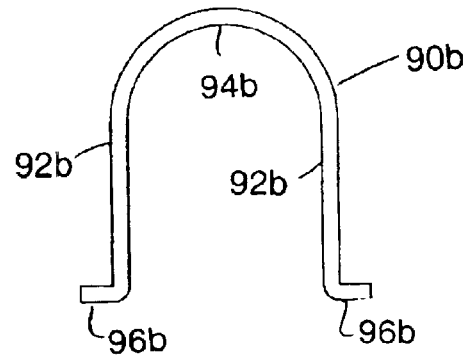
Fig. 9a
Fig. 9b
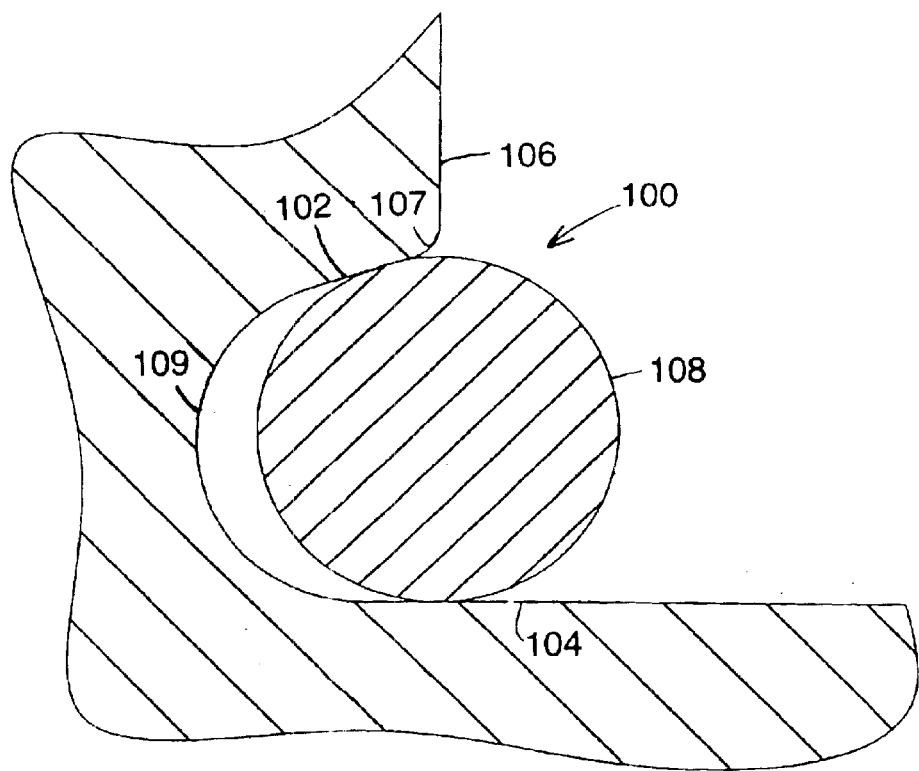
Fig. 10

HINGE HAVING ENGAGEMENT SURFACE TO RESTRAIN ROTATIONAL MOVEMENT AND ELECTRONIC DEVICE CONTAINING SUCH A HINGE

FIELD OF THE INVENTION

The invention relates to hinges. It is particularly, but not exclusively, related to hinges used in electronic devices. In one embodiment, it relates to hinges used in portable electronic devices.

BACKGROUND OF THE INVENTION

Many types of electronic devices are known. Portable electronic devices include mobile telephones, personal digital assistants (PDAs) and portable computers such as laptops. As technology improves, it is desired to include more functions in such devices. These functions may include messaging, for example e-mails and SMS (short message service), and entry of various types of information which are useful for a user to be able to access, such as address and calendar information. To provide access to these functions, the devices often comprise user interfaces such as displays and full alphanumeric keyboards or touch-sensitive screens.

It may not be necessary for the complete user interface to be available all of the time. Therefore, some of these devices are foldable so that at least part of the user interface can be stored away when it is not required. In the case of a laptop, it is typically provided in a two-part form connected by hinges having a display in one part and a keyboard in another part. In the case of a multi-function device such as a combined mobile telephone/PDA, there are occasions when a full alpha-numeric keyboard is needed, for example when composing messages or editing text, and other occasions when it is not needed, for example when it is being used as a telephone. An example of such a device is the Nokia® 9110 Communicator.

FIG. 1 shows a prior art mobile device 10. The mobile device 10 comprises a body part 12 and a cover part 14 which are moveable between a configuration in which the mobile device is open (unfolded) and a configuration in which the mobile device is closed (folded). The body part 12 and the cover part 14 are connected by a pair of hinges 16. The body part 12 comprises necessary control electronics to enable the mobile device 10 to carry out telephony and PDA functions and, on an inner surface which faces the cover part 14 when the mobile device 10 is closed, a full keyboard. The keyboard is used in operation of the mobile device 10 as a PDA and in other operations. The cover part 14 comprises a conventional telephone interface on an outer surface and, on an inner surface which faces the body part 12 when the mobile device 10 is closed, a display. The cover part also comprises an antenna for transmission and reception of radio signals.

Since these devices are usually opened to present a user interface to a user, it is convenient if they can be held open at one or more particular angular configurations. To provide this ability, hinges are used having a suitable stiffness to resist rotation. It is difficult to maintain this ability after thousands or even tens of thousands of openings since wear tends to reduce the stiffness. Although it is possible to provide additional locking means to hold the device in any desired angular configuration (including locking the device in a closed configuration), having such locking means requires additional parts which results in additional weight and space. This is often not desirable since these devices are typically portable and should be lightweight and compact.

The hinge 16 used in the device 10 is shown in FIG. 2. The hinge 16 comprises a first hinge pin element 220 attached to the body part 12 and a second hinge pin element 221 attached to the cover part 14. The hinge pin elements are fixed against rotational movement relative to their respective parts. The first hinge pin element 220 and part of the second hinge pin element 221 are contained in a common hinge pin housing (not shown). An end 222 of the first hinge pin element 220 is provided with a tab 223 and an end 224 of the second hinge pin element 221 is provided with a slot 225. The hinge pin elements abut at their respective ends so that the tab 223 is received in the slot 225. The first hinge pin element 220 is spring-biased by a spring 226 so that the tab 223 is pressed into the slot 225. This keeps the body part 12 and the cover part 14 held relatively to each other.

When the cover part 14 and the body part 12 are moved about the hinge 16 relatively to each other, the tab 223 is forced out of the slot 225, the first hinge pin element 220 moves against its spring-biasing and the hinge pin elements rotate relatively to each other.

SUMMARY OF THE INVENTION

According to a first aspect of the invention there is provided a hinge comprising a shaft part and a housing part, the parts being relatively moveable about a common axis of rotation, the shaft part having a first portion lying on the common axis of rotation, the first portion carrying a bearing surface, and a second portion extending radially beyond the bearing surface of the first portion, the housing part having an engagement surface and a hinge surface, the hinge surface cooperating with the bearing surface of the first portion and the engagement surface engaging with the second portion to restrain the shaft part from rotational movement, the shaft part being moveable relative to the housing part between a first position in which the second portion is engaged with the engagement surface and a second position in which the second portion is not engaged with the engagement surface.

In a hinge according to the invention, it is not necessary to provide separate parts, such as a latch, to provide a locking function since this is provide by the interrelation between the shaft part and the housing part. Therefore, the hinge can be provided in a miniature form relatively straightforwardly.

Preferably the bearing surface is spaced apart from the common axis of rotation in radial directions. Preferably different parts of the bearing surface are spaced from the common axis of rotation by the same distance. In this case, the first portion has a round cross-section.

Preferably the second portion extends laterally with respect to the common axis of rotation.

Preferably the hinge surface encloses the first portion. Preferably the hinge surface does not enclose the second portion. Preferably the hinge surface does not enclose the engagement surface.

Preferably, in the second position, the shaft part is not restrained from rotational movement. Preferably in this position the first portion is acted upon by a biasing force in a first direction parallel to the common axis of rotation. Preferably in moving from the first position to the second position, the second portion is displaced axially in a second direction opposite to the first direction.

Preferably the first portion and the second portion meet at a junction and are disposed in an angular relationship. Most preferably, they are disposed at right angles to each other. This disposition may not be exactly equal to 90°. It may be slightly more or slightly less. It may vary as the shaft part and the housing part move relatively to each other. In another embodiment, the first portion and the second portion meet at an acute or an obtuse angle. Preferably the first and second portions are integrally formed. They may comprise a bent wire. A wire can be bent easily to fit into small hinges. Clearly, this is also inexpensive.

Preferably the shaft part comprises spring biasing means to provide the biasing force. Preferably the biasing force is provided by energy stored when the first and second portions are moved relatively to each other. Preferably the hinge surface does not enclose the spring biasing means.

Preferably the shaft part comprises a pair of first portions. Preferably the shaft part comprises a pair of second portions. The second portions may be substantially parallel. Preferably the second portions are connected together by a connecting portion. Preferably the first portions extend from the second portions away from each other. Alternatively the first portions extend from the second portions towards each other. The second portions may lie on the same axis. They may both lie on the common axis of rotation.

Preferably the housing part comprises a pair of hinge surfaces. Each of the hinge surfaces may co-operate with the bearing surfaces of the pair of the first portions.

Each hinge surface may be associated with a pair of engagement surfaces. This pair of engagement surfaces may be provided to restrain the second portion at two separate angular orientations of the shaft. The angular orientations may be separated by an angular separation of 120°. Alternatively, the angular separation may be another value such as 90° or 180°. Each hinge surface may be associated with more than two engagement surfaces to provide more than two restraining angular orientations.

Preferably the or each engagement surface has a profile which is complementary to that of a least a part of the bearing surface of the first portion which it restrains. Alternatively, the profile is not complementary so that there is limited contact between the or each engagement surface and the first portion. The or each engagement surface may be provided by a groove having a pair of walls and a bottom. The or each engagement surface may comprise a wall of the groove. In this embodiment, restraining of the shaft part occurs by the first portion being pressed into the groove by the biasing force. In order for the shaft part to move rotationally, the first portion needs to move out of the groove. The depth of the groove may determine the amount of restraining force provided by engagement between the engagement surface and the first portion. A deeper groove may provide a greater restraining force. The angle of the groove wall may determine the amount of restraining force provided to the first portion. The restraining force may be determined by factors such as the length or the thickness of the second portion.

According to a second aspect of the invention there is provided an electronic device comprising a first body element and a second body element connected by a hinge according to the first aspect of the invention.

The hinge may enable the body elements to move relatively to each other so that the device may be opened and closed. Preferably the shaft part is fixed to one body element and the housing part is fixed to another body element.

Preferably the device is portable. Preferably the device is selected from a group consisting of a mobile station, a mobile telephone, a mobile communicator, a personal digital assistant or a mobile computer such as a laptop.

BRIEF DESCRIPTION OF THE DRAWINGS

An embodiment of the invention will be described with reference to the accompanying drawings in which:

FIGS. 9a and 9b show details of different hinge embodiments;

FIG. 10 shows detail of another hinge embodiment; and

DETAILED DESCRIPTION

Figure 1:
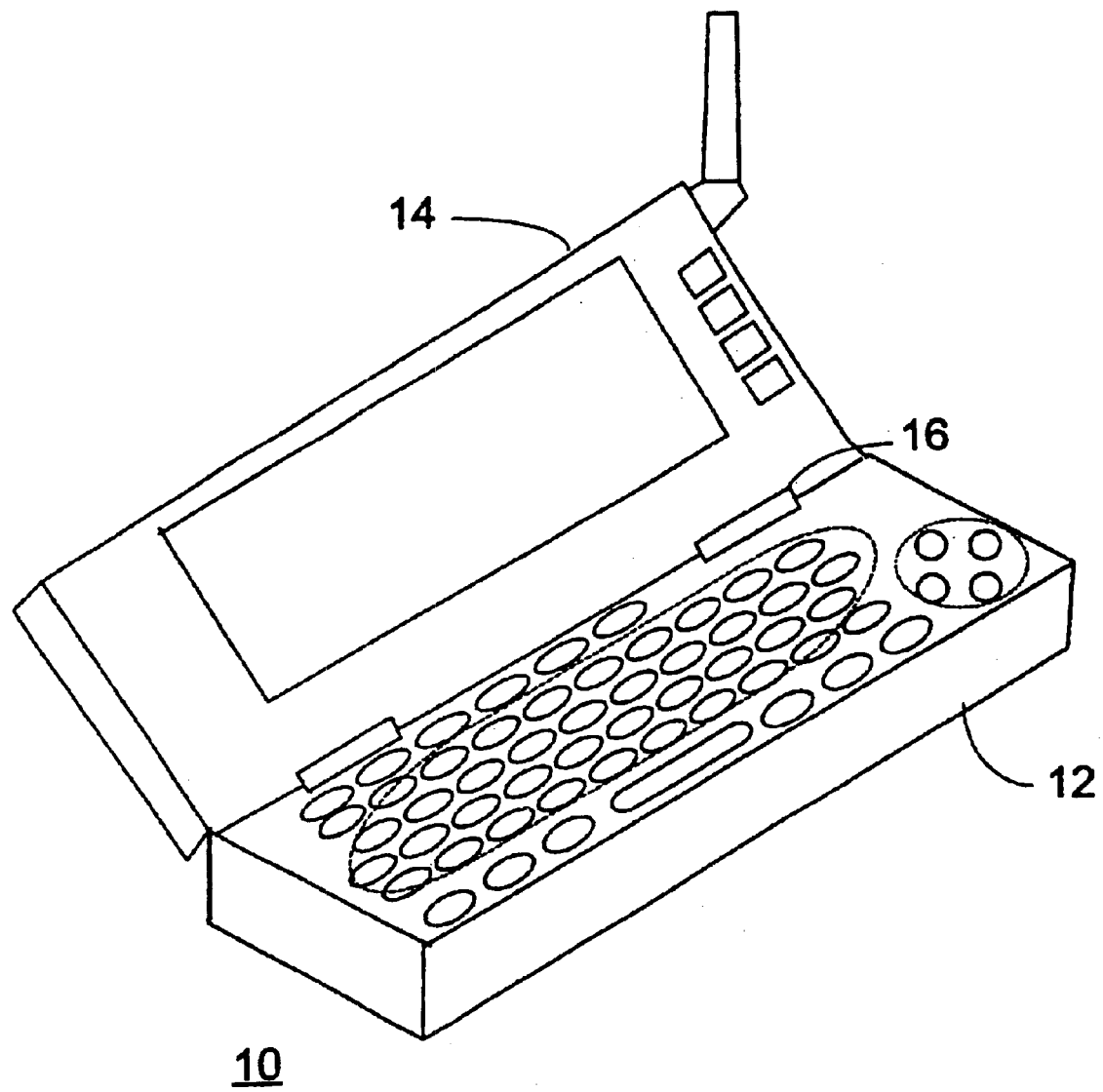
FIG. 1 shows a mobile device according to the prior art.
Figure 2:
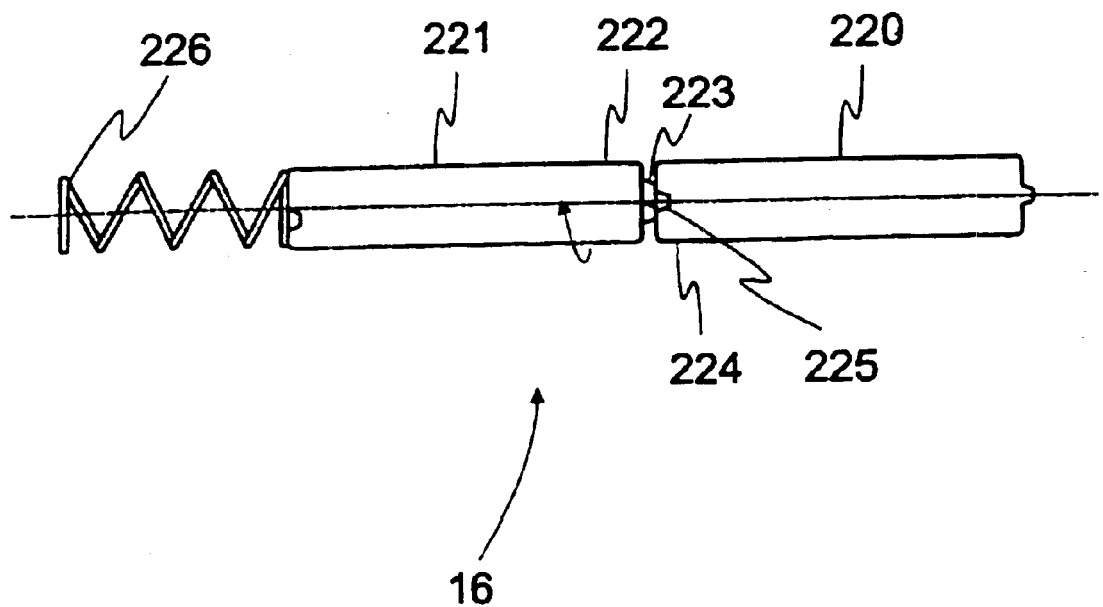
FIG. 2 shows a hinge prior according to the prior art.
Figure 3:
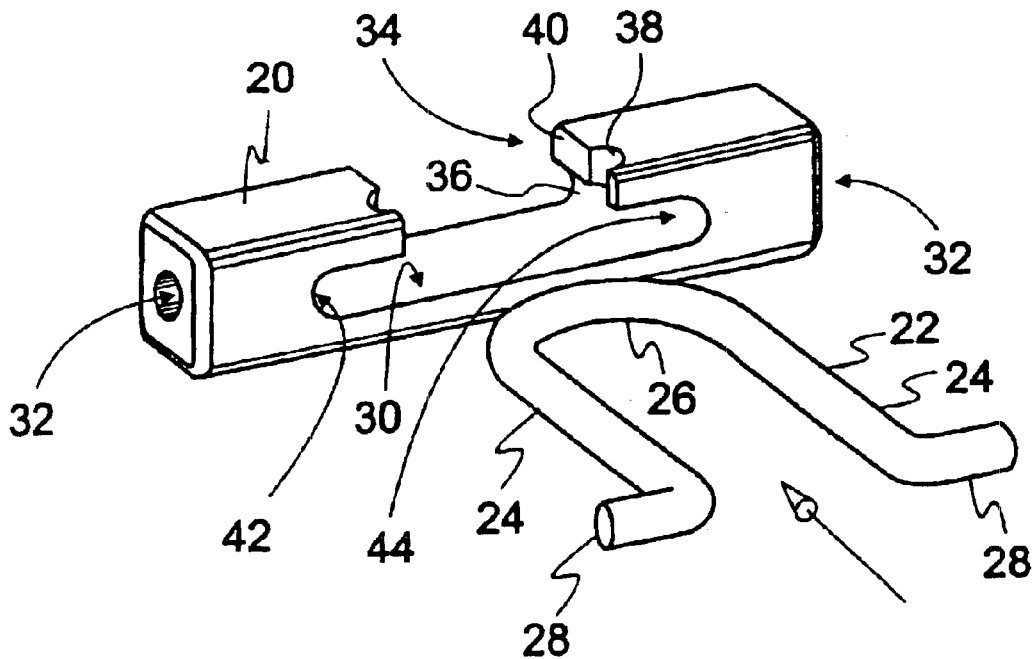
FIG. 3 shows a hinge according to the invention in a disassembled state.

FIG. 3 shows a hinge 16 according to the invention. It is shown in a disassembled state in order to present its features and its construction clearly. The hinge 16 is to be used in a mobile device according to FIG. 1 described above. The hinge 16 comprises an elongate hinge housing 20 and a co-operating hinge shaft element 22. The hinge shaft element 22 is generally U-shaped having two parallel legs 24. The legs 24 are connected at one end by a curved portion 26. Located at the other end of the legs 24 are oppositely extending hinge shafts 28.

The hinge housing 20 comprises polymeric material, such as an injection moulded plastic. The material is hard-wearing enough to resist wear caused by movement of the hinge shaft element 22.

The hinge shaft element 22 is formed out of a single piece of metal wire which is bent into shape. Spring steel wire is suitable. Once it has been formed, the hinge shaft element 22 can be elastically deformed by pushing the hinge shafts 28 towards each other. In effect, the hinge shaft element 22 is a spring. The hinge shafts 28 co-operate with the hinge housing 20. The hinge housing 20 comprises an entry part 30 into which the hinge shaft element 22 is inserted and a pair of bore holes 30 for receiving each of the hinge shafts 28. The boreholes 32 are located at opposite ends of the hinge housing 20. Each bore hole 32 is associated with a contact surface 34 over which ends of the legs 24 ride as the hinge shaft element 22 moves in relation to the hinge housing 20. The contact surfaces 34 each comprise a pair of grooves 36 and 38 separated by a flat surface 40. The entry part 30 is provided with a pair of sloping faces 42 and 44 which help in locating the hinge shafts 28 in the bore holes 32 as will be described below.

On assembly, the hinge shaft element 22 is pushed, curved portion 26 first, into the entry part 30. The hinge shafts 28 engage the sloping faces 42 and 44 and they are pushed closer together as the hinge shaft element 22 is pushed further into the entry part 30. When the hinge shafts 28 reach a position level with the bore holes 32, elastic energy stored by the hinge shaft element 22 pushes the hinge shafts 28 into place in the bore holes 32 and the hinge shaft element 22 snaps into place. It may be preferred for the hinge shaft element 22 to have a relaxed, undeformed, state in which it is wider at the ends of its legs 24 than the separation of corresponding opposing pairs of grooves. In this case, when the hinge shaft element 22 is snapped into place and the ends of the legs 24 are located in the grooves, elastic energy remains stored in the hinge shaft element 22 resulting in a biasing force being applied to the hinge shafts 28.

Figure 4:
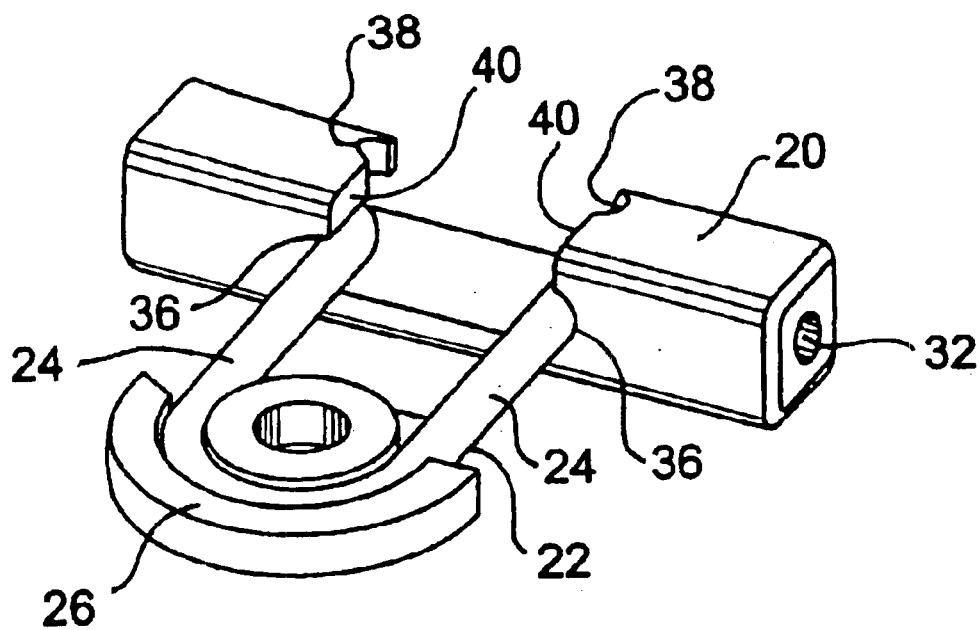
FIG. 4 shows the assembled hinge in a closed position.
Figure 5:
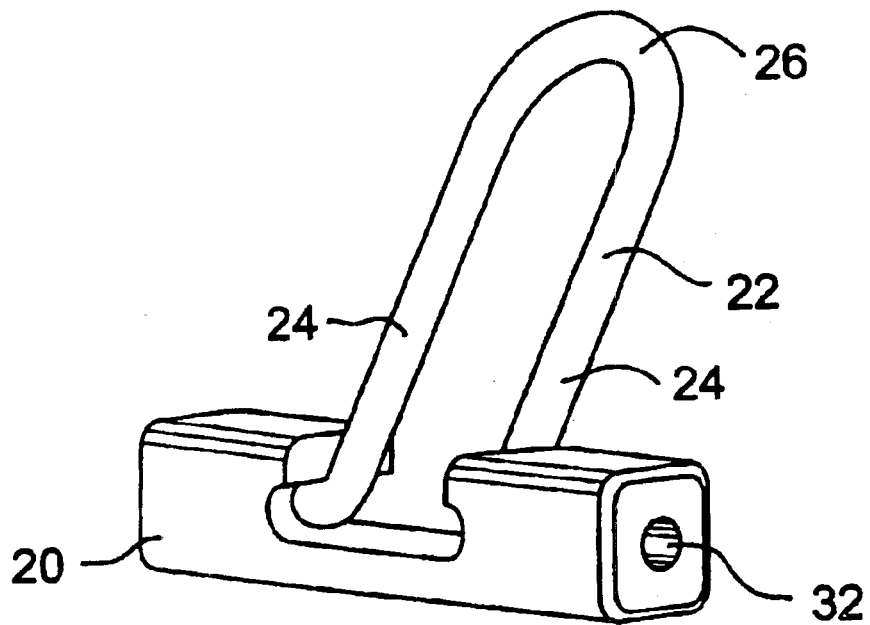
FIG. 5 shows the assembled hinge in an open position.

Once assembled the hinge can move between two locked configurations as shown in FIGS. 4 and 5. In moving, the hinge shaft element 22 moves about a common axis of rotation which runs through the boreholes 32 and through the hinge shafts 28.

FIG. 4 shows the assembled hinge 16 in a closed position in which the legs 24 are received and held in the grooves 36. The hinge housing 20 is fixed to the body part 12 of the mobile station and the curved portion 26 is fixed to the cover part 14. The body part 12 is not shown. Only part of the cover part 14 is shown. It can be seen that the curved portion 26 is located in a slot which extends around a former. A hole located in the former can receive a screw with is used to mount the hinge 16 onto the cover part 14.

FIG. 5 shows the assembled hinge 16 in an open position in which the legs 24 are received and held in the grooves 38.

In moving the hinge 16 from the closed position to the open position, force is applied to the hinge shaft element 22 to move it about the common axis of rotation. This forces the ends of the legs 24 located in the grooves 36 to ride up side walls of the grooves 36 so that the hinge shafts 28 are pushed closer together against the biasing force which acts along the common axis of rotation. As the hinge shaft element 22 is moved, the ends of the legs 24 come completely out of the grooves 36 so that they rest on the flat surfaces 40. This increases the biasing force applied to the hinge shafts 28. The legs 24 then ride across the flat surface 40 until, in their progress, they arrive at the location of the grooves 38 and are pushed into them.

It may be preferred for the hinge shaft element 22 to have a relaxed, undeformed, state in which it is as wide at the ends of its legs 24 as the separation of corresponding opposing pairs of grooves. In this case, there is no biasing force when the ends of the legs 24 are located in the grooves. However, it is still desirable for a biasing force to be applied when the ends of the legs 24 rest on the flat surfaces 40 in order that the ends of the legs be pushed into the grooves 36 and 38.

It can be understood that a certain amount of force is required to cause the ends of the legs 24 out of the grooves 36 and 38. Accordingly, the engagement of the ends of the legs 24 with the grooves 36 and 38 creates a locking force which serves to hold the hinge shaft element 22 in a particular orientation and thus likewise hold the body part 12 and the cover part 14 in a particular orientation.

To assist in understanding the preceding description, FIGS. 6a to 6d show part of a different hinge embodiment having a plurality of hinge configurations. The principles involved in operation of this hinge embodiment are the same as those involved in operation of the hinge embodiment previously described. The hinge embodiment of FIGS. 6a to 6d comprises a hinge housing 60 and a hinge shaft 62 carried by a leg 64. The hinge shaft 62 locates in a borehole 66. Grooves 67 and 68 are located on opposite sides of the borehole 66 corresponding to the hinge shaft 62 occupying rotational orientations separated by 180°. The grooves 67 and 68 are separated by a flat surface 69. As can be seen, the hinge housing 60 is presented only in a fragmentary view which shows its significant features.

Figure 6A:
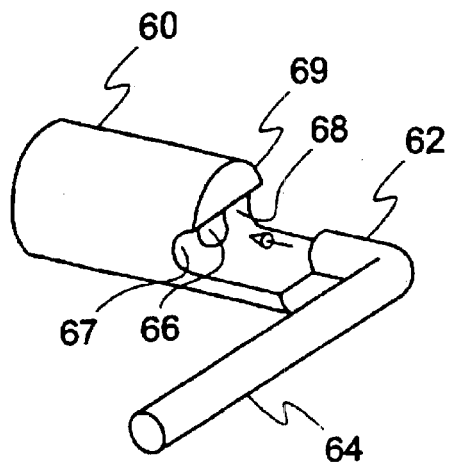
FIGS. 6a to 6d show different hinge configurations.
Figure 6B:
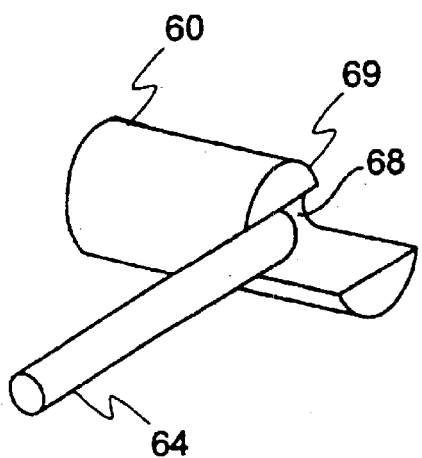
Figure 6C:
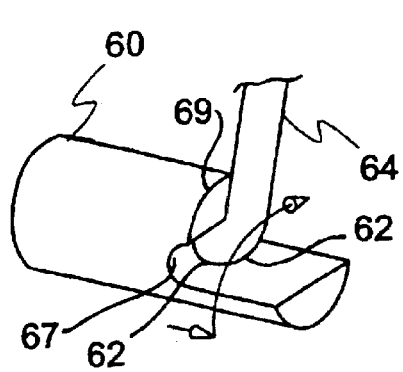
Figure 6D:
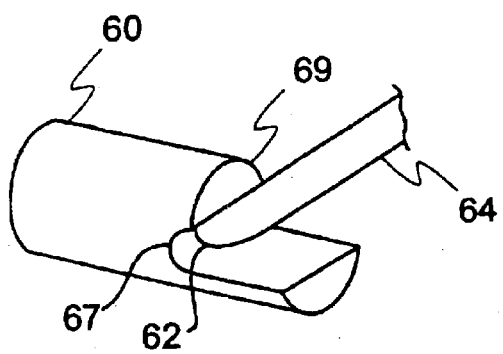

FIG. 6a shows the hinge shaft 62 being inserted into the borehole 66. FIG. 6b shows a first locking position in which the end of the leg 64 is located in the groove 67. In common with the previous description, it is held in place by a biasing force. FIG. 6c shows the leg 64 moving from the first locking position. A turning force applied to the leg 64 forces its end to come out of the groove 67 and the hinge shaft 62 to move relatively to the hinge housing 60 in a direction opposite to the biasing force. Once the leg 64 is free of the groove 67, its end can move across the flat surface 69. The biasing force increases the limiting friction between the end of the leg 64 and the flat surface 69 and so enables the leg 64 to be held relatively to the hinge housing 60 in an intermediate position between grooves. In this way, intermediate locking positions are possible although in these positions the leg 64 is not as firmly locked as the locking positions provided by co-operation between the leg 64 and the grooves 67 and 68. The end of the leg 64 completes its progression across the flat surface 69 and its end is pushed into groove 68 by the biasing force.

These Figures show an arrangement in which locking positions have an angular separation by 180°. The grooves can be located so that the locking positions have other angular separations. In addition, the hinge housing 60 may have more than two grooves in order to provide more than two locking positions.

Figures 7A, 7B:
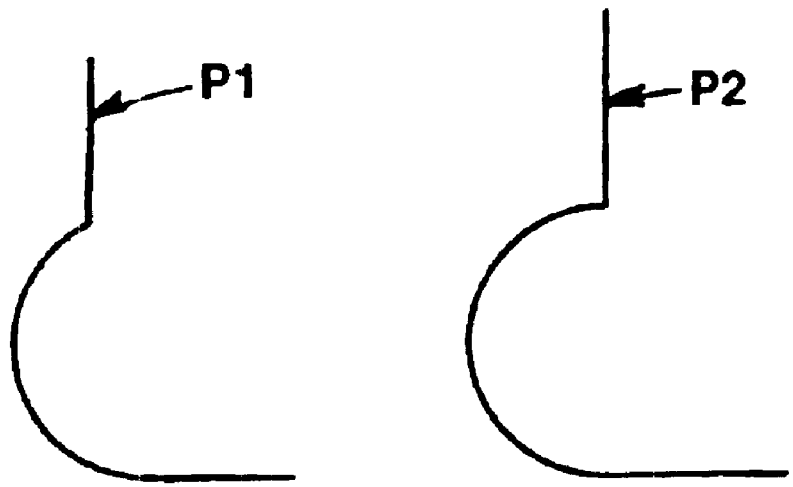
FIGS. 7a and 7b show details of different hinge embodiments.
Figures 8A, 8B:
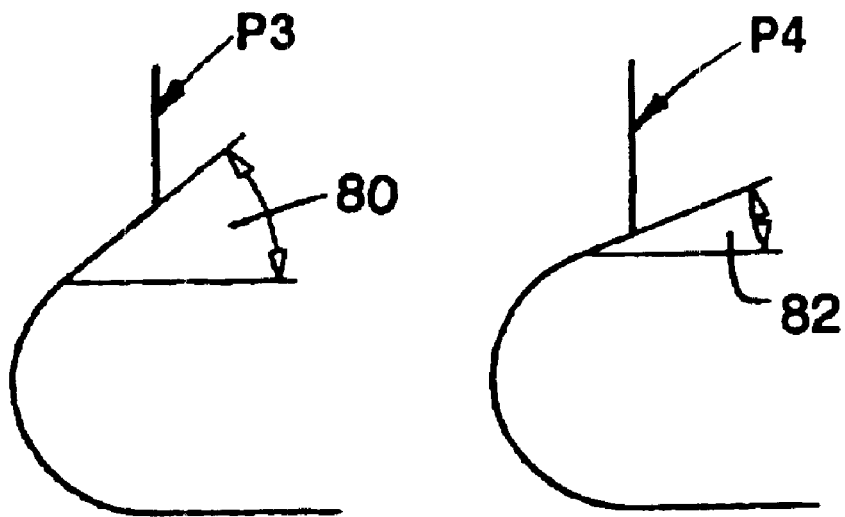
FIGS. 8a and 8b show details of different hinge embodiments.

FIGS. 7a and 7b and FIGS. 8a and 8b show details of groove profiles P1, P2, P3, P4 which can be used in any of the grooves 36, 38, 67, 68 of different hinge embodiments shown in FIGS. 3–5, and 6a–6d. The principles shown in the Figures can apply to any of the embodiments of the invention previously described. In FIGS. 7a and 7b, grooves are shown which have different depths. Deeper grooves provide a greater locking force since a leg of the hinge shaft element located in the groove has to move a further distance against the biasing force in order for the hinge shaft element to be free for rotational movement. In FIGS. 8a and 8b, groove profiles P3, P4 are shown which have different wall angles 80 and 82. The wall angle 80 provides a smaller locking force than the wall angle 82 since if the same force is applied to rotate a hinge shaft element in each case, in the case of profile P3 in the FIG. 8a embodiment, a greater proportion of this force is available to force the leg of the grove due to the wall angle 80.

FIGS. 9a and 9b show detail of hinge shaft elements 90a and 90b which can be used in different hinge embodiments. These are of the same basic configuration as the hinge shaft elements described in relation to FIGS. 3 to 5 being generally U-shaped having parallel legs 92a and 92b connected by curved portions 94a and 94b. Located at the ends of the legs are oppositely extending hinge shafts 96a and 96b. The legs 92a are longer than the legs 92b. Since it is preferred to mount the curved portions 94a and 94b of each hinge shaft element 90a and 90b in a slot extending around a former as shown in FIG. 4, the curved portions are constrained against changing their shapes in order to allow the legs 92a and 92b to be moved towards each other. Accordingly, such movement of the legs 92a and 92b occurs by elastic deformation of the legs 92a and 92b themselves. The shorter the legs are, the greater amount of force is required to provide such movement and the higher the locking force is.

The locking force can also be varied by using different thicknesses of wire to form the hinge shaft element.

FIG. 10 shows detail of a groove used in another hinge embodiment. The groove 100 has a pair of walls 102 and 104 and a bottom 109. Adjacent to the wall 102 is a flat surface 106. At the junction of groove wall 102 and the flat surface 106, a curved or rounded edge 107 is provided to reduce excessive wear or breakage. The walls 102 and 104 taper relatively to each other so that they become closer as they extend into the groove. The effect of this is to prevent a hinge shaft 108 from being able to rest at the bottom 109 of the groove 100 and instead being gripped by contact with both of the walls 102 and 104. If there are no gaps between the hinge shaft 108 and the walls 102 and 104, looseness between the body part and the cover part is eliminated, that is the shaft 108 cannot "jiggle" in the groove 100. Thus, a gap is left between the hinge shaft 108 and the bottom 109. The cooperation between the shaft and the taper angle of the walls 102 and 104 may also provide a locking force. The smaller is the taper angle, the greater is the locking force.

Figure 11:
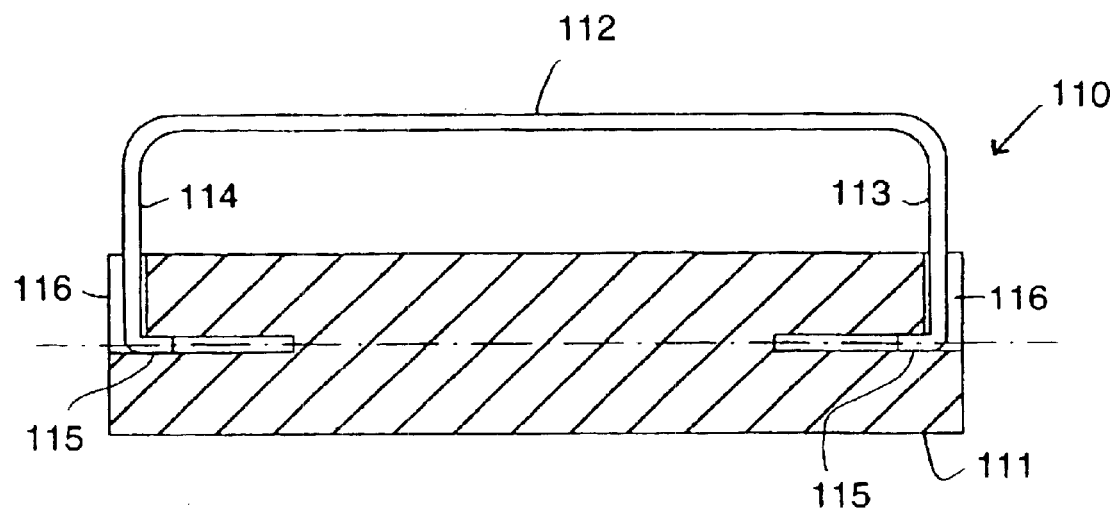
FIG. 11 shows yet another hinge embodiment.

FIG. 11 shows yet another hinge embodiment. The hinge 110 comprises a hinge housing 111 and a hinge shaft element 112. In this case the hinge shaft element 112 has legs 113 carrying hinge shafts 114 which face and extend towards each other. In FIG. 11, the legs 113 are shown located in grooves 115 and 116. End faces of the hinge housing 111 provide flat surfaces 117 and 118 over which ends of the legs can ride. In this embodiment, when the ends of the legs 113 come out of the grooves, 115 and 116, the legs 113 are opened so that the hinge shafts 115 are moved away from each other.

Figure 12:
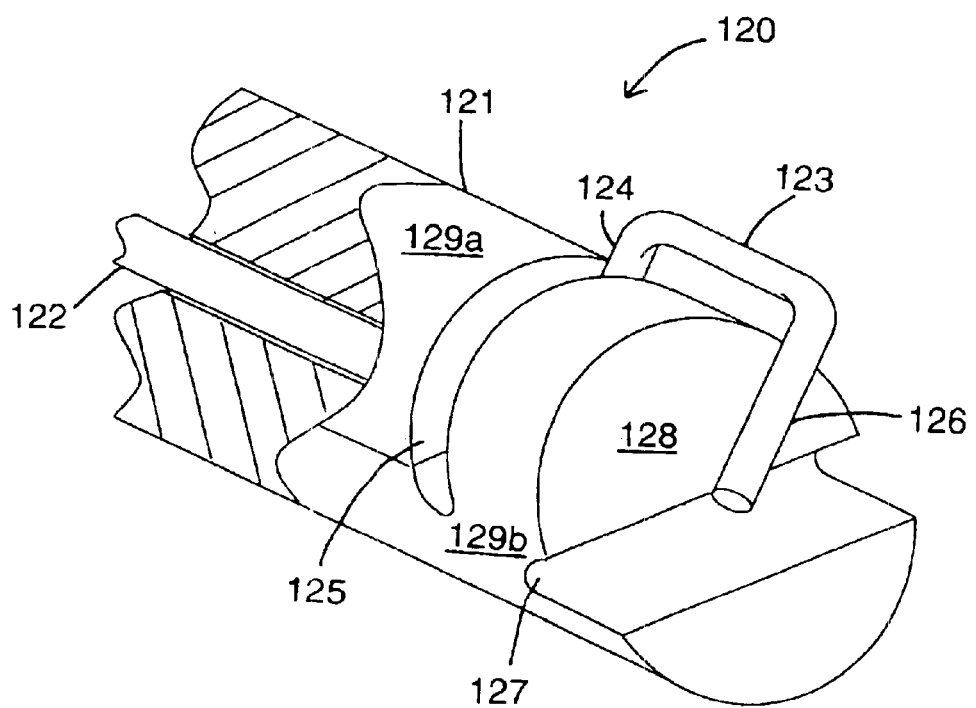
FIG. 12 shows still yet another hinge embodiment.

FIG. 12 shows still yet another hinge embodiment. The hinge 120 comprises a hinge housing 121 and a hinge shaft element 122. The hinge housing 121 is fixed relatively to the body part and the hinge shaft element is fixed relatively to the cover part. The hinge shaft element 122 terminates in a locking loop 123 a first leg 124 of which moves in a slot 125 and a second leg 126 of which engages with a groove 127. An end face of the hinge housing 121 provides a flat surface 128 over which the second leg 126 can ride when it comes out of the groove 127. The hinge housing 121 comprises two half pieces 129a and 129b to allow the hinge 120 to be assembled.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

What is claimed is:

1. A hinge comprising a shaft part and a housing part, the parts being relatively moveable about a common axis of rotation, the shaft part being a one piece member having a first portion lying on the common axis of rotation, the first portion carrying a bearing surface, and a second portion extending radially beyond the bearing surface of the first portion, the housing part having an engagement surface and a hinge surface, the hinge surface cooperating with the bearing surface of the first portion and the engagement surface engaging with the second portion to retrain the shaft part from rotational movement, the shaft part being moveable relative to the housing part between a first position in which the second portion is engaged with the engagement surface and a second position in which the second portion is not engaged with the engagement surface, and in which the first portion is acted upon by a biasing force in a direction parallel to the common axis of rotation which is provided by elastic energy stored by the second portion.

2. A hinge according to claim 1 in which the second portion is not enclosed by the hinge surface.

3. A hinge according to claim 1 in which the engagement surface is not enclosed by the hinge surface.

4. A hinge according to claim 1 in which, in the second position, the first portion is acted upon by a biasing force in a first direction parallel to the common axis of rotation.

5. A hinge according to claim 4 in which the shaft part comprises spring biasing means to provide the biasing force.

6. A hinge according to claim 1 in which the engagement surface is provided by a groove having a pair of walls and a bottom.

7. A hinge according to claim 1 in which the shaft part comprises a pair of first portions and a pair of second portions.

8. A hinge according to claim 1 in which the hinge surface is associated with at least two engagement surfaces to provide at least two restraining angular orientations.

9. An electronic device comprising a first body element and a second body element connected by a hinge, the hinge comprising a shaft part and a housing part, the parts being relatively moveable about a common axis of rotation, the shaft part being a one piece member having a first portion lying on the common axis of rotation, the first portion carrying a bearing surface, and a second portion extending radially beyond the bearing surface of the first portion, the housing part having an engagement surface and a hinge surface, the hinge surface co-operating with the bearing surface of the first portion and the engagement surface engaging with the second portion to restrain the shaft part from rotational movement, the shaft part being, moveable relative to the housing part between a first position in which the second portion is engaged with the engagement surface and a second position in which the second portion is not engaged with the engagement surface, and in which the first portion is acted upon by a biasing force in a direction parallel to the common axis of rotation which is provided by elastic energy stored by the second portion.

10. An electronic device according to claim 9 in which the shaft part is fixed to one body element and the housing part is fixed to another body element.

* * * * *